United States Patent
Soltau

Patent Number: 5,660,311
Date of Patent: Aug. 26, 1997

[54] DASHBOARD ORGANIZER

[76] Inventor: William V. Soltau, 9817C Watermill Cir., Boynton Beach, Fla. 33437

[21] Appl. No.: 533,375

[22] Filed: Sep. 25, 1995

[51] Int. Cl.$^6$ .................................................. B60R 7/00
[52] U.S. Cl. .................. 224/483; 224/277; 296/37.12; 108/45; 206/371; D12/415
[58] Field of Search .................. 224/277, 483, 224/282, 539, 540, 542, 901.8, 901, 901.2; 296/37.12, 97.7; 108/45; 211/195, 199; D12/400, 415, 426; 206/214, 371, 813

[56] References Cited

U.S. PATENT DOCUMENTS

| | | | |
|---|---|---|---|
| D. 152,475 | 1/1949 | Hueter | D12/415 |
| 2,536,084 | 1/1951 | Peters et al. | 224/483 |
| 2,547,883 | 4/1951 | Olson | 108/45 |
| 2,584,557 | 2/1952 | Cuthbertson | 108/45 |
| 2,813,749 | 11/1957 | Wetig | 296/97.7 |
| 4,512,503 | 4/1985 | Gioso | 224/539 |
| 4,577,788 | 3/1986 | Richardson | 224/277 |
| 4,619,386 | 10/1986 | Richardson | 224/277 |
| 4,846,382 | 7/1989 | Foultner et al. | 224/483 |
| 4,940,274 | 7/1990 | Ogren | 296/97.7 |
| 4,967,988 | 11/1990 | Nguyen | 224/483 |
| 5,137,147 | 8/1992 | Halper | 224/483 |
| 5,390,609 | 2/1995 | McKee | 108/45 |
| 5,419,265 | 5/1995 | Zimmerman et al. | 108/45 |

FOREIGN PATENT DOCUMENTS

| | | | |
|---|---|---|---|
| 2058159 | 6/1993 | Canada | 224/483 |
| 1480166 | 10/1969 | Germany | 224/483 |
| 1817382 | 2/1970 | Germany | 224/483 |
| 2079694 | 1/1982 | United Kingdom | 296/37.12 |
| 9002061 | 3/1990 | WIPO | 224/277 |

OTHER PUBLICATIONS

Velcro Product News; Nov. 1979, PN No. 62; Nov. 1979.

Primary Examiner—Henry J. Recla
Assistant Examiner—Gregory M. Vidovich
Attorney, Agent, or Firm—Dale Dorinski

[57] ABSTRACT

A novel dashboard organizer (10) for mounting on the dashboard of a vehicle such as an automobile, boat or airplane provides security and ready access for various items such as pens, pencils, calculators, rulers, letter openers, maps, notes, or turnpike tickets. The organizer has a base (20) that attaches to the upper surface of the vehicle dashboard, and approximately conforms to the general shape of the dashboard. The body (30) of the organizer is attached to the base such that the body is held in a substantially vertical position. The forward-most portion (32) of the body is arranged so that it comes in contact with the vehicle's windshield, and the remainder (34) of the body is arranged to provide storage (42, 44, 46, 48) for one or more of the above mentioned objects. When mounted in proper position on the vehicle dashboard, the organizer lies generally perpendicular to the long axis of the dashboard, thus dividing the dashboard into two sections. The dashboard organizer serves as a barrier to prevent loose objects from extemporaneously moving from one section of the dashboard to the other section of the dashboard while the vehicle is in motion.

17 Claims, 3 Drawing Sheets

DASHBOARD ORGANIZER

CROSS REFERENCE TO RELATED DOCUMENTS

A disclosure document describing the subject of the claims of this application was filed by the applicant with the U.S. Patent and Trademark Office on Mar. 18, 1994.

TECHNICAL FIELD

This invention relates in general to an apparatus which can be used to hold objects in a vehicle, and more particularly, to an organizer which can be mounted on a vehicle dashboard to hold a variety of objects.

BACKGROUND

Very often, the driver of an automobile or truck needs to store objects such as pens, pencils, note papers, calculators, turnpike tickets and coins in a handy location. Unless there is some readily available place where these objects can be kept, they tend to slide about when the vehicle is brought to a sudden stop or turned sharply. This can lead to dangerous situation wherein these projectiles flying about the interior of the vehicle can injure the occupants. Moreover, if the driver attempts to retrieve the objects while driving, his attention must be averted from the roadway, potentially causing an accident. Numerous attempts have been made to provide a location for the various objects one needs in everyday life while on the road. The original location familiar to all is the glove compartment or glove box. The problem with this location is that it is typically on the passenger side of the vehicle, and is too far from the driver to be easily reached. Also, the vertical door that opens downward allows the items stored in the glove box to easily spill out. Automobile manufacturers have attempted to improve on this situation by creating the console between the driver's seat and the passenger seat. The typical console also doubles as an arm rest, and has become a convenient place to store tape cassettes, compact discs, coins, pens, pencils, cellular telephones, etc. Since the console is top opening, it functions much better than the conventional glove box in holding these various objects. A very large multi-functional console may be found in Dodge Ram trucks manufactured by the Chrysler Corporation. This console incorporates electrical outlets for cellular telephones, FAX machines, cigarette lighters, and also has space for tape cassettes, pens, pencils, various papers, and has a large top surface that can be used as a miniature desk for writing. Unfortunately, the Dodge console and all other consoles suffer from the problem of a disadvantageous location. In order to retrieve an item from the console, the driver must turn sideways and look down to open the console and then rummage through the crowded interior of the console to locate the item of interest. Needless to say, this can be a hazardous operation when one is in heavy traffic.

Others have attempted to solve this problem by essentially moving the console from the position between the seats to a more suitable location on the dashboard. U.S. Pat. Nos. 4,619,586; 4,577,788; 4,846,382; 5,419,265; 3,104,895; and 5,025,919 each describe an after-market box or tray-like structure that is designed to be mounted on a vehicle dashboard and provide a writing surface and/or storage for other items. While these inventions solve the location problem, they generally suffer from being large and unwieldy, and can partially obscure the drivers field of vision. In addition, the large dashboards of some trucks are frequently used by the drivers as a shelf to store papers, blueprint rolls, books, and various other items too large to fit into the glove box, the console, or any of these after-market dashboard organizers. One major problem inherent in all the devices disclosed in the above patents is that the various attachment schemes all leave a significant gap between the bottom of the apparatus and the top of the dashboard. This is because all the prior art devices are essentially planar or box-like, and the dashboard of modern vehicles is a complex curving structure, with dips, slopes and compound curves. Thus, items kept on the dashboard will tend to slide under the prior art organizers whenever the vehicle navigates a sharp turn or when a gust of wind comes into the vehicle window. Trucks used off-road, such as in the construction and farming trades, are particularly prone to losing items, as they are operated over very rough terrain, and bounce around significantly. Often, an item will simply scoot clear across the dashboard and exit out the side window when one executes a sharp turn. In these situations, it is critical for the driver to keep both hands on the steering wheel and his eyes on the vehicle path, rather than to leap about in an attempt to recover or restrain flying papers.

Accordingly, there is a need for a multipurpose accessory which can be secured to a vehicle dashboard that is able to hold a variety of objects and prevent other items stored on top of the dashboard from flying about. Such an item would not only provide convenience to the driver, but would be a safety feature because it would allow the driver to maintain concentration on the task at hand, driving.

DETAILED DESCRIPTION OF THE PREFERRED EMBODIMENTS

A novel dashboard organizer for mounting on the dashboard of a vehicle such as an automobile, van, truck, boat or airplane provides security and ready access for various items such as pens, pencils, calculators, rulers, letter openers, maps, notes, turnpike tickets, etc. The organizer has a base that attaches to the upper surface of the vehicle dashboard, and approximately conforms to the general shape of the dashboard. The body of the organizer is attached to the base such that the body is held in a substantially vertical position. The forward-most portion of the body is arranged so that it comes in contact with the vehicle's windshield, and the remainder of the body is arranged to provide storage for one or more of the above mentioned objects. When mounted in proper position on the vehicle dashboard, the organizer lies generally perpendicular to the long axis of the dashboard, thus dividing the dashboard into two sections. The dashboard organizer also serves as a barrier to prevent loose objects from extemporaneously moving from one section of the dashboard to the other section of the dashboard while the vehicle is in motion.

Figure 1:
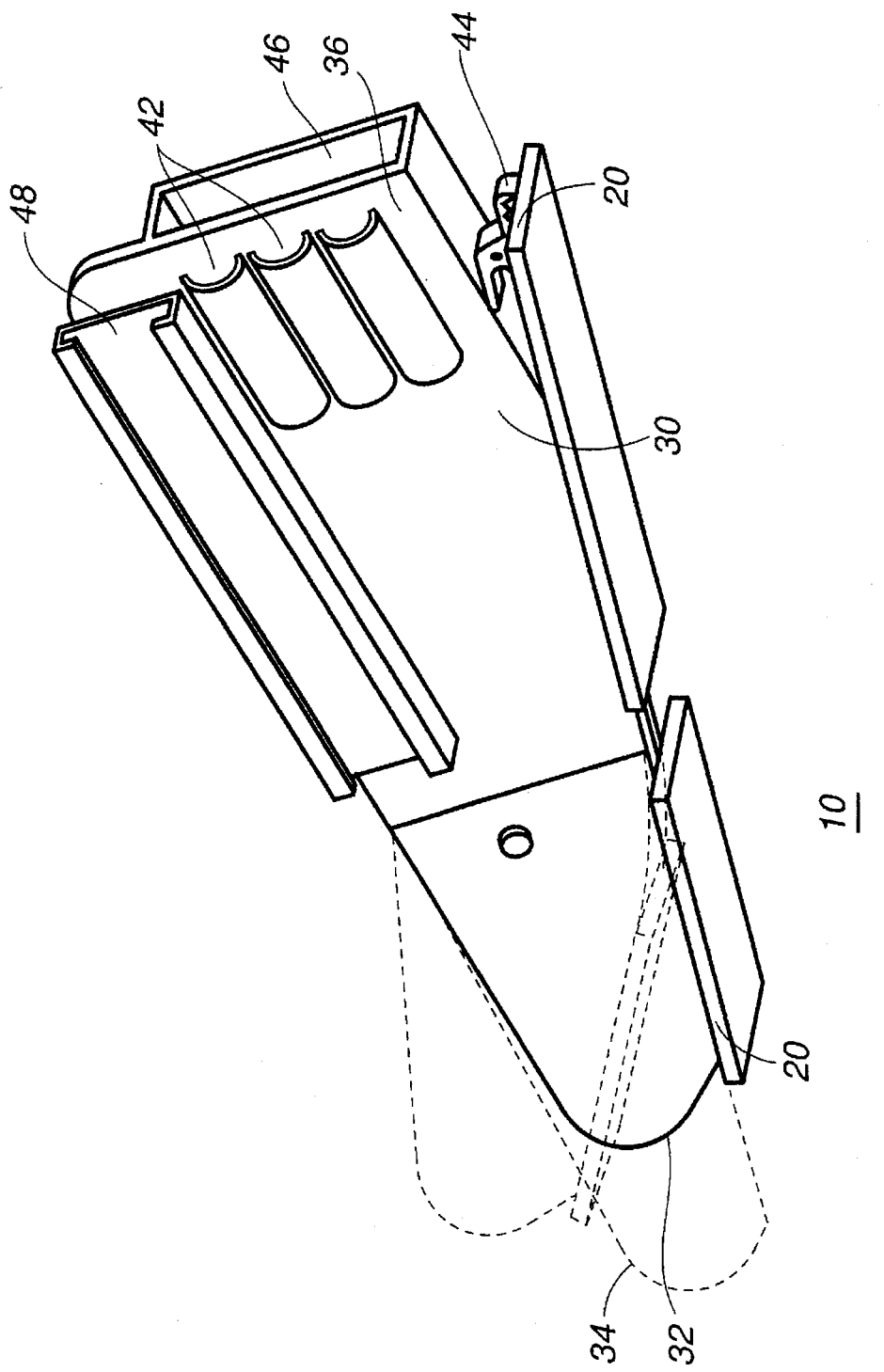
FIG. 1 is a perspective view of the left side of a dashboard organizer mounted in a vehicle in accordance with one embodiment of the invention.
Figure 2:
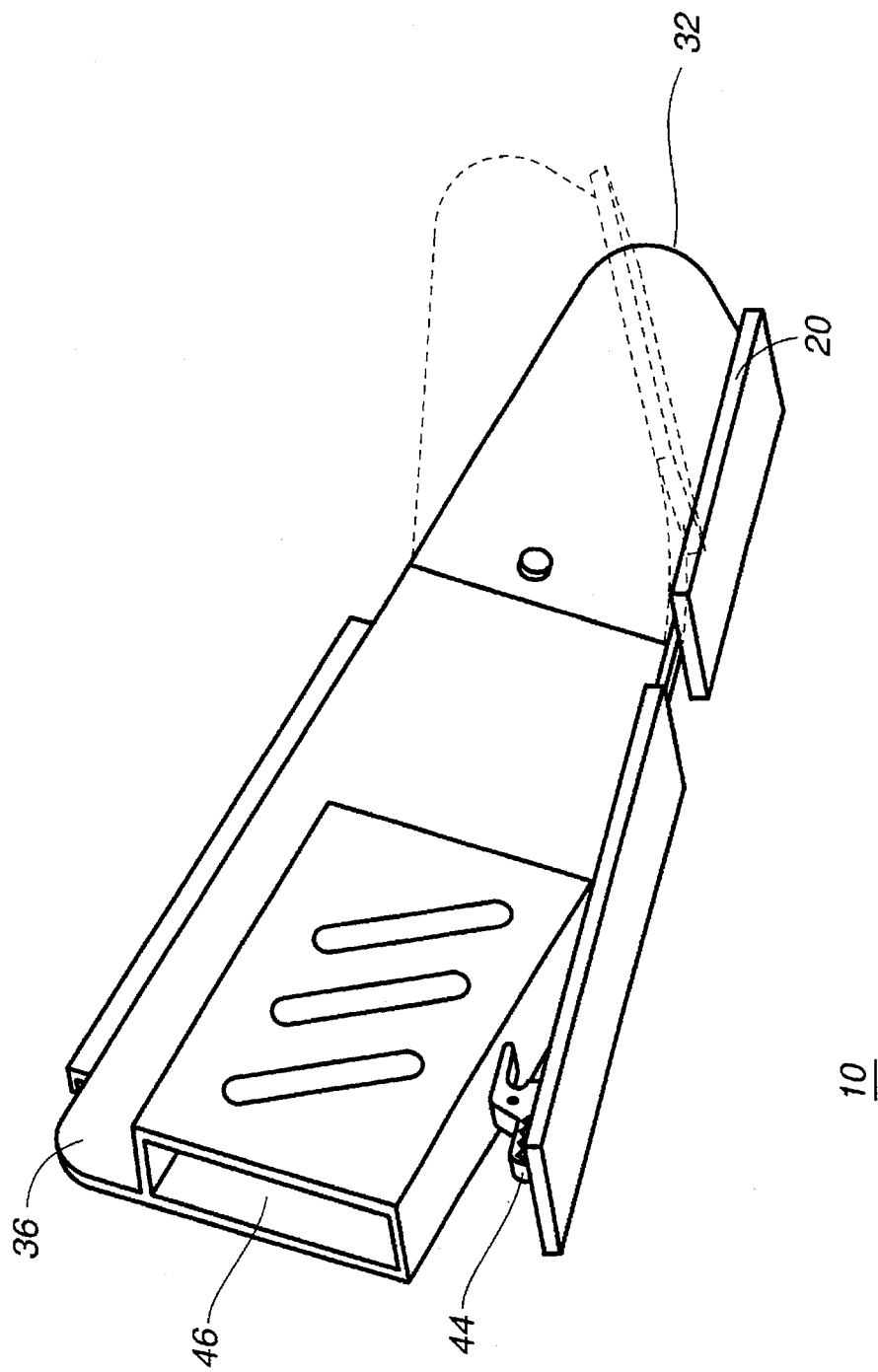
FIG. 2 is a perspective view of the right side of the dashboard organizer shown in FIG. 1.

While the specification concludes with claims defining the features of the invention that are regarded as novel, it is believed that the invention will be better understood from a consideration of the following description in conjunction with the drawing figures, in which the reference numerals are carried forward. Referring now to FIG. 1, one embodiment of a dashboard organizer 10 has a base portion 20 that is used to secure the organizer to an upper or top surface of a vehicle dashboard 15. The base 20 typically has a flat bottom side that comes into contact with the dashboard when in use. In the preferred embodiment, the organizer is attached to the dashboard with a suitable adhesive, in order to preclude from drilling holes in or otherwise damaging the dashboard. Adhesives such as pressure sensitive adhesives, epoxies, urethanes, acrylics, double sided adhesive tape, and room temperature vulcanizing (RTV) silicones are especially useful, but others may be employed with equivalent efficacy, depending on the situation. Alternatively, the familiar VELCRO hook and loop fasteners from the 3M Company of Minneapolis, Minn. will render the dashboard organizer easily removable, and thus able to be transferred from one vehicle to the next. The base is shown in FIG. 1 as being of two parts so as to allow the base to easily assume the general shape of various types of dashboards. The reader will appreciate that most, if not all, dashboards in modern vehicles have a complex shapes consisting of undulating surfaces and compound curves. Although shown in two straight parts, the base may also consist of simply a single part that is curved in a particular fashion to conform to specific makes and models of vehicles, or it maybe more complex, consisting of multiple parts that provide a greater degree of freedom, thus accommodating a wider variety of vehicle contours. The base serves as the foundation for the body 30 of the organizer. The body 30 is attached to the base 20 at the bottom portion of the body so that the body is held upright in a vertical position. The reader will appreciate that some extreme situations might result in the body leaning somewhat to one side or the other after attachment to the dashboard, due to local curves in the dashboard mounting area. However, it is the general intent that the body 30 of the organizer 10 be situated with respect to the base 20 so that it is much taller than it is wide. This is in direct contrast to all of the prior art devices that have a shape that is generally horizontal, the width being much greater than the height. This is because the prior art devices are all intended to provide some sort of a writing surface, thus must create a flat, horizontal area. In contrast, the instant invention stands essentially upright, thereby making the items stored in the organizer more readily available to the user. In one embodiment, the dashboard organizer is made of injection molded plastic, and the joint between the base and the body is either formed in the injection modeling process or is made in a post-molding operation. For example, the body may be attached to the base by adhesive bonding, mechanical fasteners, snap fits, or fusion bonding (ultrasonic welding, solvent bonding, hot staking, etc.).

The forward facing end 32 of the dashboard organizer is intended to be near the vehicle windshield, in order to block the movement of objects stored on top of the dashboard. Although the organizer can perform its intended blocking function with the forward end 32 being near, but not touching, the windshield, it is desirable to have at least a portion of the organizer body in at least partial contact with the windshield. Obviously, the greater the better the fit between the organizer and the windshield glass, the better the organizer will function to prevent objects from sliding about on the dashboard. In order to better facilitate this fit, one alternate embodiment of the invention finds the forward end 32 being adjustable by having an adjustable portion 34 that can be modified to change the length of the organizer body. This will allow a custom fit to various vehicles, and also allow a better fit to various locations in the same vehicle. It is envisioned that the forward end 32 can even make partial or complete contact with the windshield. The ability to conform to the profile of the windshield further enhances the utility of the organizer in preventing loss of articles stored on top of the dashboard. One way to do this is to fabricate the adjustable portion 34 from a plastic or fibrous material that can be easily cut and trimmed to proper length, or attaching it to the forward end 32 so that it slides in and out, thus shortening or extending the length of the forward end. However, it should be noted that the organizer may still be a certain distance from the windshield and still perform the function of blocking the movement of large objects on the dashboard. The gap between the forward end and the windshield may be as large as several inches. Since the vehicle driver typically does not reach so far as to touch the windshield, the forward end 32 and particularly the adjustable portion 34 do not typically have storage facilities for objects of interest. To reiterate, the ability to custom form the dashboard organizer to precisely fit each vehicle provides the best possible fit, thereby maximizing the capability to prevent movement of objects and papers that are stored on top of the dashboard from moving from one side of the vehicle to the other.

The rear portion 36 of the organizer contains holding means such as storage compartments or holders for the various objects to be stored on/in the organizer. Holding means may also be situated on portions of the base 20 in order to maximize storage and ergonomic function. Examples of some various types of holding means are holders 42 for writing instruments such as pens, penefts and marking pens; clips 44 for retaining loose papers, tickets, notes or maps; pockets 46 for items such as calculators, two way radios, cellular telephones, cigarette packages, matches, address books, or credit cards; and holders 48 for straight or triangular rulers (such as a draftsman's scale), letter openers, or POST-IT notes (the sticky yellow note pads made by 3M Company of Minneapolis, Minn.). These items and storage means are presented by way of illustration, and not byway of limitation, and the skilled artisan will appreciate that other types of holding means to store additional items may certainly be envisioned and still fall within the metes and bounds of the claimed invention.

Figure 3:
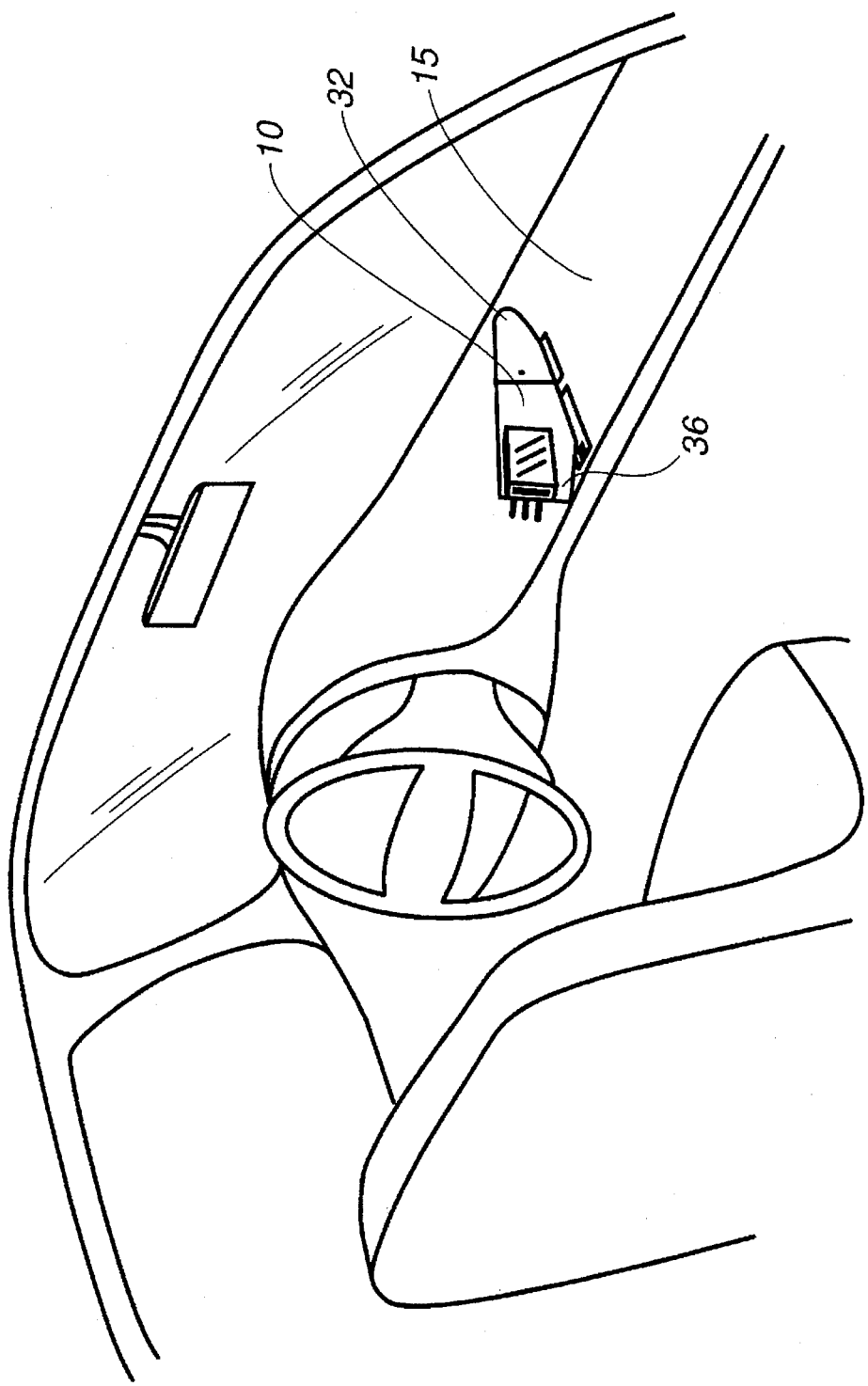
FIG. 3 is a photo of one embodiment of the dashboard organizer mounted in a vehicle.

Having now described the structure of the preferred embodiment, the mounting scheme and advantages of operation of the novel dashboard organizer will be explained. The dashboard organizer 10 is intended to be mounted on the dashboard in a fashion that will result in the long axis of the organizer being generally perpendicular to the long axis of the dashboard (See FIG. 3). That is, the organizer 10 should be situated so that the forward end 32 is near the windshield and the rear portion 36 is facing the rear of the vehicle. This puts the rear portion 36 that carries the various storage means 42, 44, 46, 48 in a position to be readily accessible to the driver, without the driver having to reach uncomfortably long distances or twist about. When mounted in this fashion, the organizer 10 also divides the dashboard into two sections, one on each side of the organizer. Judicious placement of the organizer 10 in the vehicle will create a large storage area on top of the dashboard that can be used to store large and bulky items such as papers, blueprint rolls, books, and various other items too large to fit into the glove box, The close fit and large vertical profile of the organizer creates a convenient divider that blocks the extemporaneous movement of the objects when the vehicle navigates a sharp turn, sudden stop, or other rough terrain.

Another embodiment finds the body 30 of the organizer 10 divided into two or more portions. In this case, the base 20 may also be divided into two or more corresponding portions, or it may simply contain one portion, and the remainder of the body portions are not secured to the dashboard surface. In this situation, the body 30 contains a pivoting mechanism to allow the body to be articulated about an axis. The dotted lines in FIG. 1 show the forward end 32 of the body swung about the pivoting mechanism in one position so as to allow the organizer to be custom shaped to fit a particular dashboard. This articulation is in keeping with the theme of allowing the user to customize the organizer to the individual vehicle. One example of a pivoting mechanism is a loose rivet or other type of fastener joining the forward end 32 to the rear portion 34. Other types of mechanism that allow the two portions to articulate with respect to each other are also contemplated, such as a living plastic hinge.

In summary, a novel dashboard organizer has been presented which can be secured to a vehicle dashboard that will hold a variety of useful objects and prevent other large items stored on the dashboard from flying about. This organizer not only provides convenience to the driver, but is a safety feature because it allows the driver to maintain concentration on the road. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, a third member maybe disposed between the forward portion of the organizer and the windshield to further aid in blocking the movement of objects. This third member does not necessarily need to be attached to the organizer, but can be proximal to it.

What is claimed is:

1. A dashboard organizer for a vehicle having a dashboard and a windshield, comprising:
    a base for attaching to a top surface of the vehicle dashboard, said base having a length and a width, said length being at least three times greater than said width, and said base approximately conforming to a general shape of the top surface;
    a body having a height, a length and a width, the height being substantially greater than width, the body attached to the base at a bottom portion of the body along the length and width of the body such that the body is held substantially upright;
    the width of the base being substantially less than the height of the body;
    the length of the base being parallel to the length of the body;
    a forward portion of the body arranged to be oriented toward the windshield, and a rearward portion of the body having a holding means arranged to provide storage for one or more objects;
    said dashboard organizer arranged to divide the dashboard into two sections when mounted on the dashboard; and
    the body serving as a barrier to extemporaneous movement of loose objects from one section of the dashboard to the other section of the dashboard.

2. The dashboard organizer as described in claim 1, wherein the holding means is affixed to a vertical surface of the body.

3. The dashboard organizer as described in claim 1, further comprising an adhesive material affixed to a bottom surface of the base, for securing the dashboard organizer to the dashboard.

4. The dashboard organizer as described in claim 1, wherein the body or the base are made from plastic.

5. The dashboard organizer as described in claim 1, wherein the body is generally planar.

6. The dashboard organizer as described in claim 2, wherein the holding means comprises a holder for a calculator, a holder for one or more writing instruments, or a retaining means to hold papers.

7. The dashboard organizer as described in claim 1, wherein the height of the body is perpendicular to the top surface of the vehicle dashboard.

8. A dashboard organizer for a vehicle having a dashboard and a windshield, comprising:
    a multi-part body having a height, a length and a width, the height being substantially greater than width, the body further having a pivoting means to allow first and second parts of the body to be articulated about an axis;
    a base for attaching the organizer to a top surface of the dashboard, the base having a length and a width, the length being at least three times greater than the width, and the base having securing means to attach the base to the dashboard;
    the base attached to the first part of the multi-part body at a bottom portion of the body along the length and width of the first part of the multi-part body such that the first part of the multi-part body is held in a substantially vertical arrangement when the base is attached to the dashboard;
    the width of the base being substantially less than the height of the multi-part body;
    a forward portion of the first part of the multi-part body arranged to face towards the windshield;
    the second part of the multi-part body having a holder for retaining an object in a position suitable to be easily retrieved by a driver of the vehicle;
    said dashboard organizer arranged to be mounted on the vehicle dashboard width the length of the body on an axis generally perpendicular to a long axis of the dashboard, thus dividing the dashboard into two sections; and
    the multi-part body serving as a barrier to extemporaneous movement of loose objects from one section of the dashboard to the other section of the dashboard.

9. The dashboard organizer as described in claim 8, wherein a length of the forward portion of the first part of the multi-part body may be adjusted by the user.

10. The dashboard organizer as described in claim 8, wherein the multi-part body may be articulated to a position that approximately conforms to a general shape of the dashboard.

11. The dashboard organizer as described in claim 8, wherein the first and second parts of the multi-part body are generally planar.

12. The dashboard organizer as described in claim 8, further comprising a holder for a ruler on the multi-part body.

13. The dashboard organizer as described in claim 8, further comprising a holder for a calculator, a holder for one or more writing instruments, or a retaining means to secure one or more loose papers.

14. A dashboard organizer for a vehicle having a dashboard and a windshield, comprising:
    a multi-part body having a height, a length and a width, the height being substantially greater than width, the body further having a pivoting means to allow the body to be articulated about an axis;
    a multi-part base for attaching to a top surface of the dashboard, said base having an adhesive material on a bottom side to secure the multi-part base to the dashboard;

the multi-part base having a length and a width, the length being at least three times greater than the width, and the width of the multi-part base being substantially less than the height of the multi-part body;

a first part of the multi-part base attached to a first part of the multi-part body at a bottom portion of the first part of the multi-part body along the length and width of the first part of the multi-part body such that the multi-part body is held in a substantially vertical arrangement when the multi-part base is attached to the dashboard;

a second part of the multi-part base attached to a second part of the multi-part body at a bottom portion of the body such that the body is held in a substantially vertical arrangement when the multi-part base is attached to the dashboard;

a forward portion of the first part of the multi-part body arranged to face the windshield;

the second part of the multi-part body having a holder for retaining an object in a position suitable to be easily retrieved by a driver of the vehicle;

said dashboard organizer arranged to be mounted on the vehicle dashboard with the length of the body on an axis generally perpendicular to a long axis of the dashboard, thus dividing the dashboard into two sections; and the multi-part body serving as a barrier to extemporaneous movement of loose objects from one section of the dashboard to the other section of the dashboard.

15. The dashboard organizer as described in claim 14, wherein the body is articulated to a position that approximately conforms to a general shape of the dashboard.

16. The dashboard organizer as described in claim 14, further comprising a holder for a calculator, a holder for one or more writing instruments, or a holder for a ruler on the second part of the multi-part body.

17. The dashboard organizer as described in claim 14, further comprising a retaining means to secure one or more loose papers.

* * * * *